Nov. 18, 1924.                                                                          1,515,616
H. A. POPPENHUSEN
METHOD AND APPARATUS FOR RECOVERING SCRAP METAL
Filed June 13, 1923          3 Sheets-Sheet 3

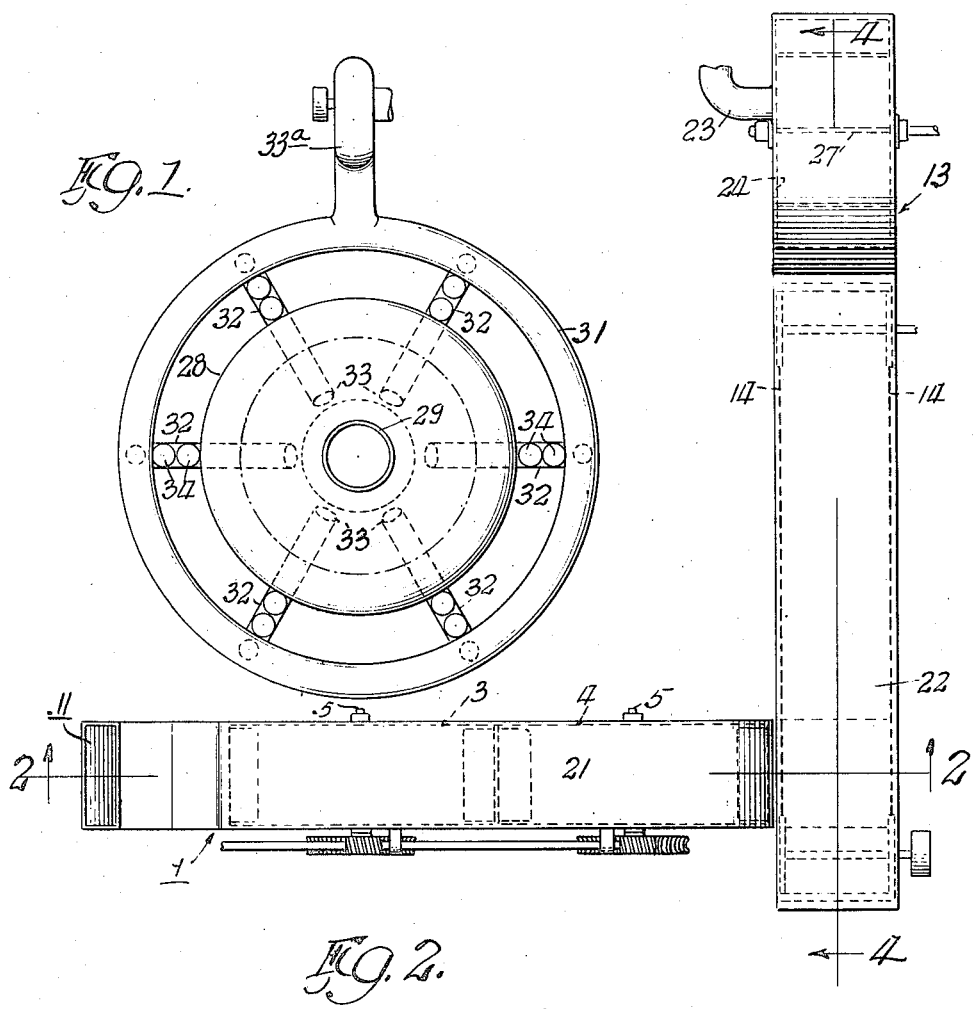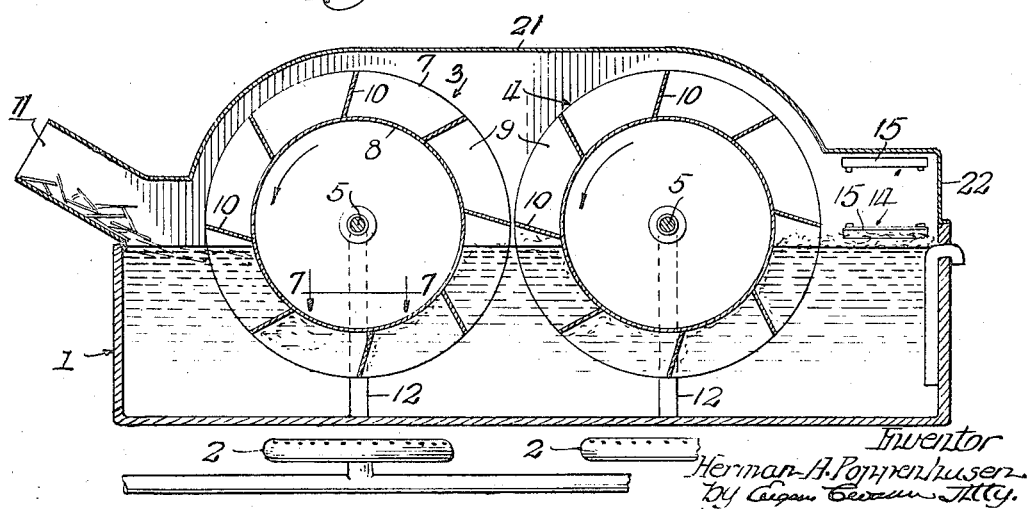

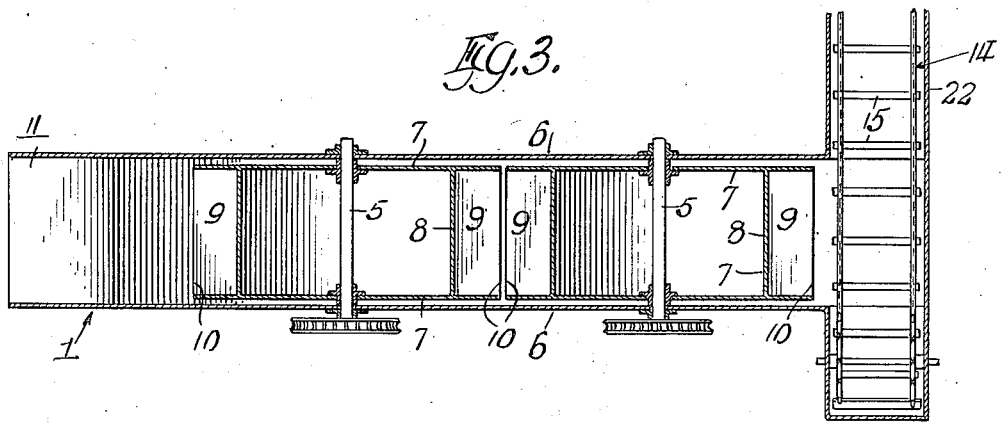
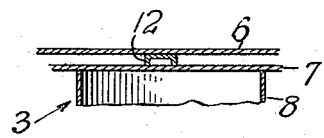
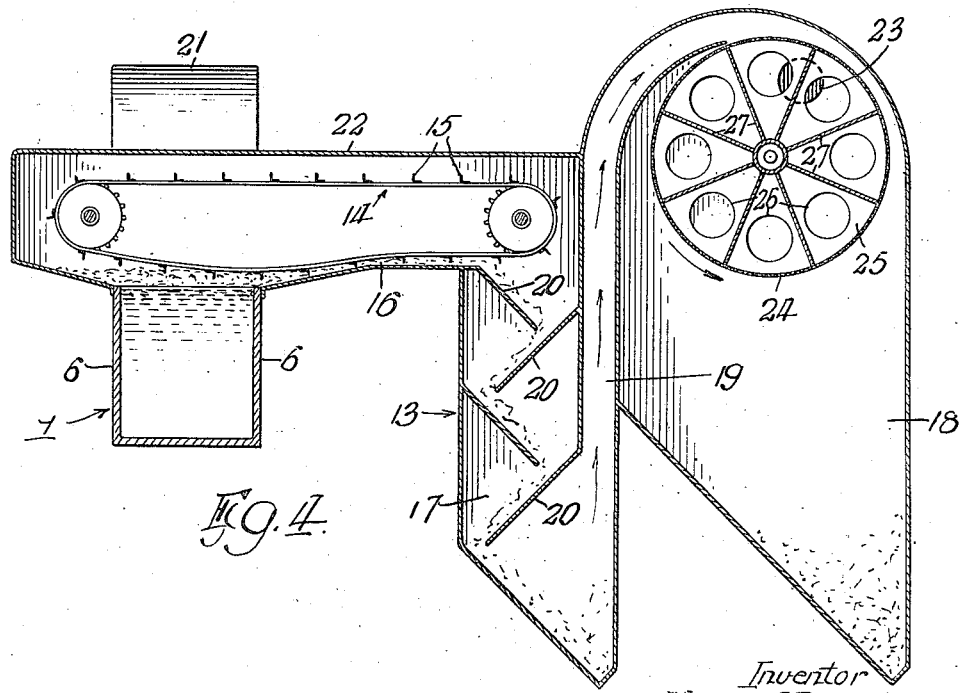

Inventor
Herman A. Poppenhusen
by Eugene Evans Atty.

Patented Nov. 18, 1924.

1,515,616

UNITED STATES PATENT OFFICE.

HERMAN A. POPPENHUSEN, OF HAMMOND, INDIANA.

METHOD AND APPARATUS FOR RECOVERING SCRAP METAL.

Application filed June 13, 1923. Serial No. 645,073.

*To all whom it may concern:*

Be it known that I, HERMAN A. POPPENHUSEN, a citizen of the United States, residing at Hammond, in the county of Lake and State of Indiana, have invented new and useful Improvements in Method and Apparatus for Recovering Scrap Metal, of which the following is a specification.

This invention relates to a method and apparatus for removing a given metal from scrap containing said given metal in metallic and compound form.

Briefly, the method consists in, first, melting out the metallic metal in the scrap at a heat lower than the fusing point of the compound form to liberate the latter; second, separating the liberated compound form into heavier and lighter particles by currents of air so that said particles may be separately handled, and, third, recovering the metal contained in said particles by introducing the same into a blast furnace, the heavier particles into the furnace through its charging opening, and the lighter ones in the furnace with the blast.

In melting out the metallic metal from the scrap, it is the object of my invention to discharge the scrap into one chamber of a melting pot or kettle on the surface of the molten metal therein of the kind to be melted and to carry the scrap down through the molten metal to the bottom of said chamber to melt out the given metal and liberate the non-fusing compound form of that metal, the liberated compound form entering a communicating chamber at the bottom and rising through the molten metal therein to collect on the surface of the molten metal in said last named chamber for removal for subsequent treatment in accordance with the other steps of my improved method.

Separating the compound form of said metal into heavier and lighter particles by currents of air is, in accordance with my invention, done by passing the mixed particles as taken from the surface of the molten metal through a separator. This allows for the recovery of the metal contained in both groups of particles without wasting either by introducing said particles into a blast furnace, the heavier through the charging opening of the furnace without the force of the draft carrying said heavier particles up the stack as waste, and the lighter particles into the reduction zone of the furnace with the blast.

A further object of my invention is to carry out the method of the same in a closed chamber or conduit to prevent the dust and fumes arising in the practice of the method entering or escaping into the workroom to injure or impair the health of the workmen.

Practicing my improved method in a closed chamber or conduit is an important factor when melting lead from scrap battery plates, for which the method is particularly applicable, as the oxide, dust, and lead fumes given off are highly injurious to workmen in and about such a plant if allowed to escape into the atmosphere.

In treating scrap battery plates, the metallic lead is melted out by the molten lead in the kettle or pot into which the scrap plates are first introduced, and the metal content of the liberated oxide recovered in a blast furnace in the manner hereinbefore mentioned.

The invention consists further in the matters hereinafter described and more particularly set forth in the appended claims.

In the accompanying drawings—

Fig. 1 is a diagrammatic view illustrating the arrangement of the apparatus employed in practicing the method or process of my invention;

Fig. 2 is an enlarged longitudinal vertical sectional view taken on line 2—2 of Fig. 1 through the apparatus at the first step of the method, namely, where the metallic form of the metal to be recovered from the scrap is melted out by submerging the scrap into molten metal of the kind to be recovered from said scrap;

Fig. 3 is a top plan view of the apparatus of Fig. 2, the top or cover being removed;

Fig. 4 is a vertical sectional view showing the scraper and separator in conjunction with the apparatus of Fig. 2, the section being taken on line 4—4 of Fig. 1;

Fig. 7 is a detail section on line 7—7 of Fig. 2.

Figure 5:
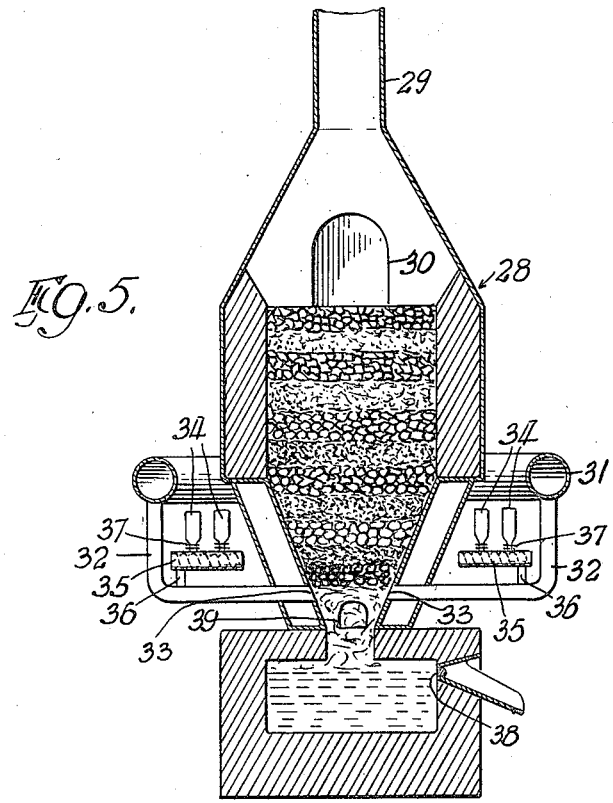
Fig. 5 is a vertical sectional view, somewhat in diagram, through a blast furnace and showing the manner in which the lighter particles mentioned are introduced into the air blast of the furnace.

Scrap metal, such as scrap battery plates, is introduced into a kettle or pot 1 containing a molten metal of the kind to be melted from the scrap, lead when melting scrap battery plates. The metal in said pot or kettle 1 is maintained in molten condition by heat applied against the same in any suitable way, as by oil or gas burners 2, 2 of Fig. 2. In said kettle 1 are two rotary members, preferably in the form of paddle wheels 3, 4 mounted on shafts 5, 5 extending horizontally across the pot 1 and journaled in the side walls 6, 6 thereof. Each paddle wheel 3, 4 has imperforate side members or shrouds 7, 7, between which extends an annular member 8 concentrically arranged in the wheel but of a diameter less than the side members 7, 7 to form an annular chamber divided into a plurality of peripheral pockets 9, 9 by partitions or blades 10, 10. Said wheels 3, 4 are partially submerged in the molten metal in the kettle or pot 1 and the blades 10 are arranged at such an angle that they carry the scrap trapped in the pockets 9 down into the molten metal as they are revolved.

The scrap is introduced into the kettle 1 at one end through a spout or chute 11 in front of the paddle wheel 3. The scrap floats and accumulates on the surface of the molten metal and parts are entrapped in the pockets 9 as the wheel 3 is revolved in the direction of the arrow shown in Fig. 2. This carries batches of scrap down through the molten metal in the kettle 1 and the speed of the wheel is such that the metallic metal of the scrap (lead when scrap battery plates are used) is melted out by the time that the pocket containing a batch reaches the level of the molten metal on the side opposite the introduction of the scrap.

To gain complete conversion of the metallic metal to molten form, the paddle wheel 4 is employed. This is made exactly like the one 3 and is set close to it, as shown in Fig. 2, so that its pockets 9 carry batches of the scrap floating on the surface of the molten metal (where it leaves the wheel 3) down through the molten metal, and frees it at the other side of the wheel 4, as shown in Fig. 2. This double immersion of the scrap insures the complete melting out of the metallic metal, leaving the non-fusing compound form of that metal free to rise on the surface of the molten metal in the kettle 1 at the right of the wheel 4, when two wheels are employed, or at the right of the wheel 3 when only one is used. This compound form, oxide when scrap battery plates are handled, bubbles up on the discharge side of said wheel 4. This brings the succeeding accumulation of oxide to the under side of the accumulated mass ready for removal in a manner to be presently described. Being on the under side keeps it hot and tends to drain off mechanically attached melted lead. This avoids the possibility of carrying away melted lead with the removal of the oxide.

The kettle 1 is divided at the rotary members or wheels 3, 4 by partition strips 12, 12 (Figs. 2 and 7) into chambers communicating beneath said wheels. This makes it necessary to carry the scrap down through the molten metal in one chamber before being liberated to the other as clearly indicated in Fig. 2.

The accumulated oxide at the right-hand end of the kettle 1 is carried into a separator 13 by a conveyer 14. The latter may take any form desired, but as shown in Fig. 4 it comprises an endless chain or like member carrying a plurality of outwardly projecting scraper blades 15 to scrape the oxide from the kettle 1 over a floor 16 into the separator 13.

Said separator 13 is at the discharge end of the conveyer 14 and comprises a casing divided into two vertically arranged chambers 17, 18, both having hopper bottoms with gated outlets (not shown). The chamber 17 communicates with the one 18 by a conduit 19. This extends from the bottom of the chamber 17 to the top of the one 18. In the chamber 17 are downwardly inclined baffle plates 20, 20, staggered as shown.

Scrap battery plates when received at the melting plant are dry and the contained oxide and dust flies freely as they are handled. This, together with the fumes given off when melting the plates, if allowed to escape to the workroom would injure the health of the workmen by causing lead poisoning. To prevent this and also serve the purpose of my invention, I house the kettle 1 above the paddle wheels 3, 4 by a cover or casing 21. This casing joins a casing 22 housing the conveyer 14 and extending to the separator chamber 17.

By means of the casings 21, 22, and 13, a draft or current of air is carried from the inlet spout or chute 11 through the kettle or pot 1, over the wheels 3, 4, and over and about the conveyer 14, down through the separator chamber 17, and into the conduit 19 to the chamber 18 and out through the pipe 23 of said chamber 18. This draft or current of air is induced by an exhaust fan or other means attached to the pipe 23 and carries dust and fumes arising from the oxide being separated from the plates down through the separator and allows the heavier particles of oxide to collect in the hopper bottom of the chamber 17. The lighter particles carried by the air current pass upward with the heated current through the conduit 19 and are deposited on the outside of a rotating separator 24.

Said separator 24 is in the form of a cylinder having its cylindric surface in the form of a wire mesh screen, as indicated in Fig. 4. One of its end walls (not shown) is imperforate while its other end wall 25 is provided with a plurality of circumferentially spaced holes 26. Between the end walls of this cylinder are a plurality of radially arranged partition walls 27, which divide the cylinder into a plurality of radial compartments, each containing one of the holes 26. The cylinder 24 is rotatably mounted in any suitable manner in the chamber 18 and is turned in the direction of the arrow in Fig. 4. The lighter particles deposited on the screen by the air passing therethrough to the pipe 23 are dropped by gravity as the cylinder 24 is rotated in the hopper bottom of the chamber 18.

The pipe 23 opens into the chamber 18 through its side wall adjacent the end member 25 of the separator 24 and in position to register with the holes 26 as the separator is revolved. Any dust rising from the accumulation of said lighter particles finds its way to the pipe 23 by passing through the screen 24 and that opening 26 of the radial compartment which registers with the pipe 23 on the side immediately adjacent the compartment at the discharge end of the conduit 19, as indicated in Fig. 4.

To recover the lead or other given metal carried by the heavier and lighter particles in the chambers 17 and 18, it is in accordance with my invention to introduce said particles into a blast furnace 28 shown in Fig. 5. The heavier particles will not be blown into the stack 29 by the draft passing up through the furnace, and therefore may be discharged into the upper end of the furnace through the usual charging opening 30, as shown in Fig. 5. These particles may be charged into the furnace in alternate layers between layers of coke, in accordance with the usual smelting process, and the freed lead collected in a molten state at the bottom of the furnace.

The lighter particles of oxide collected in the chamber 18 would be blown up the stack 29 by the draft on the furnace should an attempt be made to charge them into the furnace through the charging opening 30, so I provide a means whereby these lighter particles may be introduced into the furnace directly at the zone of reduction with the blast.

Surrounding the furnace 28 is a wind box 31 connected by vertical and horizontal conduits 32 with the tuyères 33 of said furnace. These conduits 32 supply blast to the furnace at the reduction zone in the usual manner. The wind box 31 is connected with draft supplying means of any desired type, a blower 33$^a$ shown by way of example in Fig. 1.

For introducing these lighter particles into the blast supply in advance of the tuyères 33, I provide in connection with one or more of the conduits 32 a pair of vertically arranged tanks 34, 34 which open at their lower ends into a screw conveyer 35. The latter opens by a vertical pipe 36 into the horizontal section of the adjacent conduit 32. Both tanks 34 are filled with the lighter particles and, by suitable valves 37 associated with the tanks, one tank is open and, the conveyer 35 operated, conducts the lighter particles into the adjacent conduit 32. There they are picked up by the air blast, carried in suspension, and discharged into the furnace at the reduction zone, namely, where the lead from the heavier particles introduced through the top of the furnace is converted into molten form. Consequently, there is no opportunity afforded for these lighter particles to be blown out through the chimney or stack as waste, inasmuch as they are immediately introduced into the furnace where the heat is sufficient to fuse the metallic or lead content thereof.

By having a pair of tanks 34 for a conduit 32, it is possible to have the operation of charging the blast with these lighter particles substantially continuous. As one tank empties, the loaded one is opened to the conveyer and the empty one closed, whereupon it may be filled or charged while the other is discharging.

The blast furnace shown in Fig. 5 is of the usual type and the molten metal or lead taken off from time to time by tapping through the outlet opening 38. The slag produced in the operation may be taken off through the tap opening 39 in the side wall of the furnace.

Figure 6:
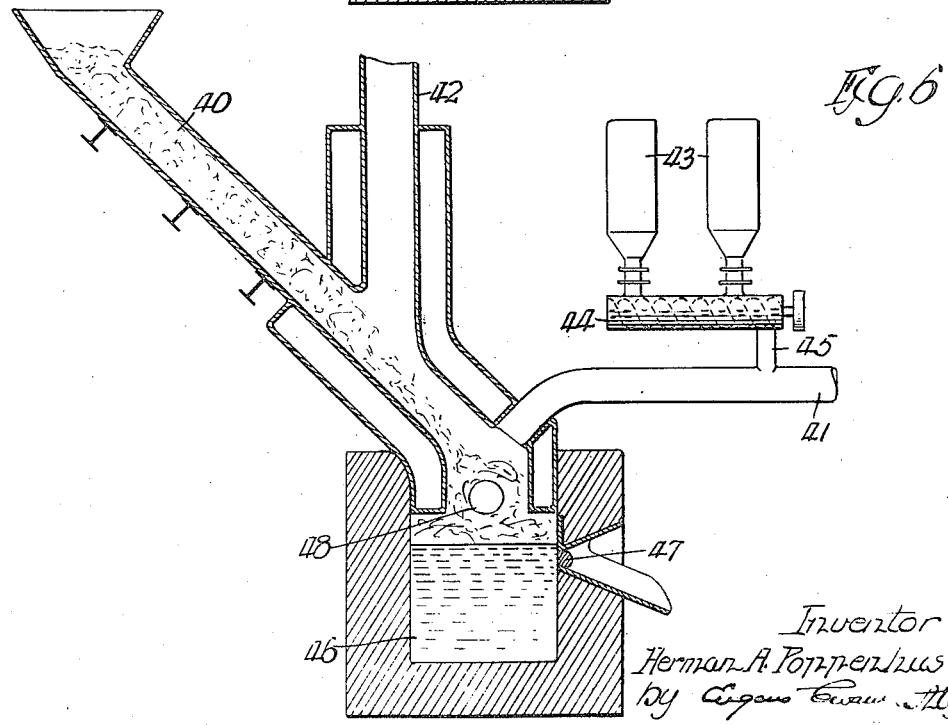
Fig. 6 is another form of blast furnace showing the manner in which said lighter particles may be introduced into the blast stream.

Should it be desired to recover, by my improved method, metal from scrap by a furnace of a type other than the one shown in Fig. 5, I may employ a furnace having the general form shown in Fig. 6. There the heavier particles mixed with the coke are introduced into the furnace through a chute 40, which discharges directly into the combustion chamber, and an air blast is introduced into the furnace through the incoming heavier particles by a pipe 41. The products of combustion pass up the chimney or stack 42, which opens into the chute 40 above the reduction zone. A pair of vertically arranged tanks 43 are employed and these communicate when their valves are open with a screw or other conveyer 44, which discharges into the blast pipe 41 by a pipe 45. The metal or lead regained by the smelting process collects in the lead chamber 46 and may be tapped off from time to time through the opening 47, in the same manner as in the blast furnace of Fig. 5. The furnace of Fig. 6 has also a slag tap 48.

By the method described there may be a complete recovery of substantially all of the metallic or lead content of the scrap handled. The provision of carrying the lead oxide from the melting chamber 1 through the separating apparatus 13 and putting it in such shape that it may be readily handled in a blast furnace, makes possible the recovery of pure lead from the oxide without wasting the oxide as heretofore. Moreover, the apparatus and method described enables the economical and efficient recovery of lead from the oxide dust, which heretofore has been a waste product, and allows the recovery being performed by a method and means which prevent the contamination of the employes about the plant, inasmuch as the entire system is closed against dust and fumes rising to have any injurious effects. Thus the method described is a safe one in that it preserves the health of the employes and, in addition to that, prevents the discharge of lead dust into the atmosphere to do property damage.

While I have shown and described herein an apparatus for practicing the method or process of my invention, it is of course to be understood that the details of construction and arrangement of parts shown and described may be variously changed and modified without departing from the spirit and scope of my invention.

I claim as my invention:

1. The method of recovering a given metal from scrap containing said given metal in metallic and compound form, which consists in, first, melting out the metallic metal at a heat lower than the fusing point of the compound form to liberate the latter, and second, separating the heavier from the lighter particles of the liberated compound for recovery of the metal content thereof by subsequent treatment.

2. The method of recovering a given metal from scrap containing said given metal in metallic and compound form, which consists in, first, melting out the metallic metal at a heat lower than the fusing point of the compound form to liberate the latter, second, separating the liberated compound form into heavier and lighter particles by currents of air so that said particles may be handled separately, and, third, recovering the metal content of said particles by introducing them into a blast furnace, the heavier into the furnace through its charging opening, and the lighter into the furnace at the zone of reduction of the heavier particles.

3. The method of recovering a given metal from scrap containing said given metal in metallic and compound form, which consists in, first melting out the metallic metal at a heat lower than the fusing point of the compound form to liberate the latter, second, separating the liberated compound form into heavier and lighter particles by currents of air so that said particles may be handled separately, and, third, recovering the metal content of said particles by introducing them into a blast furnace, the heavier into the furnace at its charging opening, and the lighter into the furnace with the blast.

4. The method of recovering a given metal from scrap containing said given metal in metallic and compound form, which consists in, first, melting out the metallic metal at a heat lower than the fusing point of the compound form to liberate the latter, second, separating the liberated compound form into heavier and lighter particles by currents of air so that said particles may be handled separately, and, third, recovering the metal content of said particles by introducing them into a blast furnace, the heavier into the furnace at its charging opening, and the lighter into the furnace with the blast by introducing said lighter particles into the blast stream before entering the furnace.

5. The method of recovering lead from scrap battery plates, which consists in, first, melting out the metallic lead of the plates to liberate the lead oxide carried thereby, second, separating the liberated oxide into heavier and lighter particles by a current of air, and, third, recovering the lead from these particles by introducing the same into a blast furnace, the heavier into the furnace through its charging opening, and the lighter into the furnace at the zone of reduction of the heavier particles.

6. The method of recovering lead from scrap battery plates, which consists in, first, melting out the metallic lead of the plates to liberate the lead oxide carried thereby, second, separating the liberated oxide into heavier and lighter particles by a current of air, and, third, recovering the lead from these particles by introducing the same into a blast furnace, the heavier into the furnace through its charging opening, and the lighter into the furnace with the blast.

7. The method of recovering lead from scrap battery plates, which consists in, first, introducing the scrap plates into molten lead and submerging the scrap plates in said molten lead for melting out the metallic lead of said plates and liberating the oxide carried by said plates, second, removing the oxide floating on the surface of the molten lead and separating the lighter particles of the oxide from the heavier ones by a current of air, and, third, recovering the lead from these particles by introducing the same into a blast furnace, the heavier into the furnace through its charging opening, and the lighter into the furnace with the blast.

8. The method of recovering a given metal from scrap containing said given metal in metallic and dusty compound form, which consists in, first, separating said forms by heat, and, second, separating the heavier from the lighter particles of the liberated compound for recovery of the metal content thereof by subsequent treatment, the steps of the method being conducted in a manner to confine the liberated dust, fumes, and the like.

9. The method of recovering a given metal from scrap containing said given metal in metallic and dusty compound form, which consists in, first, separating said forms by heat, and, second, separating the heavier from the lighter particles of the liberated compound for recovery of the metal content thereof by subsequent treatment, the steps of the method including the last mentioned separating step being conducted in a manner to confine the liberated dust, fumes, and the like.

10. The method of recovering lead from scrap battery plates, which consists in, first, melting out the metallic lead of said plates in a closed chamber to prevent the liberated dust, oxide, and fumes escaping to the workroom, second, removing by a current of air said oxide, dust, and fumes to a closed separator for separating the heavier from the lighter particles of oxide for subsequent treatment for the recovery of the contained lead.

11. An apparatus for recovering a metal from scrap containing said metal, comprising a melting kettle, means dividing said kettle into chambers communicating below the level of the molten metal, means for carrying the scrap floating on the molten metal in one chamber down through the molten metal to melt out the metallic metal and allow the liberated non-fusing compound to enter the other chamber and rise therein.

12. An apparatus for recovering a metal from scrap containing said metal, comprising a melting kettle, a rotary member in said kettle and having peripheral pockets, and partition means at the sides of said rotary member which divide the kettle into chambers communicating below said rotary member.

13. An apparatus for recovering a metal from scrap containing said metal, comprising a melting kettle, a plurality of rotary members arranged one in front of the other in said kettle, peripheral pockets in said rotary members, and partition means at the sides of said rotary members which divide the kettle into chambers communicating below said rotary members.

In testimony that I claim the foregoing as my invention, I affix my signature, this 7th day of June, 1923.

HERMAN A. POPPENHUSEN.